United States Patent [19]

Jitsumori

[11] 4,268,120
[45] May 19, 1981

[54] AUTOMOBILE MIRROR DEVICE

[76] Inventor: Tsuneharu Jitsumori, 171 Oi, Seto-cho, Akaiwa-gun, Okayama-ken, Japan

[21] Appl. No.: 81,529

[22] Filed: Oct. 3, 1979

Related U.S. Application Data

[63] Continuation of Ser. No. 911,120, May 31, 1978, abandoned.

[30] Foreign Application Priority Data

Jun. 2, 1977 [JP] Japan .................................. 52-72468
Apr. 25, 1978 [JP] Japan .................................. 53-55148

[51] Int. Cl.³ .......................................... G02B 7/18
[52] U.S. Cl. .................................. 350/302; 248/483
[58] Field of Search ....................... 350/301, 302, 304; 248/483

[56] References Cited

U.S. PATENT DOCUMENTS

| | | | |
|---|---|---|---|
| 1,565,291 | 12/1975 | Pearch | 350/302 |
| 1,666,236 | 4/1928 | Fuerth | 350/302 |
| 2,302,952 | 11/1942 | Pfeifer | 350/302 |
| 2,796,003 | 6/1957 | Kaufman | 350/304 |
| 3,434,688 | 3/1969 | Engelmann | 248/483 |
| 3,512,746 | 5/1970 | Vitaloni et al. | 248/483 |

FOREIGN PATENT DOCUMENTS

| | | | |
|---|---|---|---|
| 772322 | 4/1935 | France | 350/301 |
| 254214 | 7/1926 | United Kingdom | 350/301 |

Primary Examiner—Jon W. Henry

[57] ABSTRACT

A device whereby the safety in such dead angle parts as the front wheel part on the other side of a driving seat and the part a little forward of said part and in the rear can be confirmed in the driving seat.

In the hood part on the other side of the driving seat of an automobile, there are provided an objective mirror directed to the front wheel part on said other side and the part a little forward of said part, a reflecting mirror to reflect the image shown on said objective mirror back to the driving seat and a rear confirming mirror in the back position of said objective mirror so that the safety in said dead angle parts, the other side of the driving seat and the rear can be confirmed by the driver at the same sighting point.

1 Claim, 7 Drawing Figures

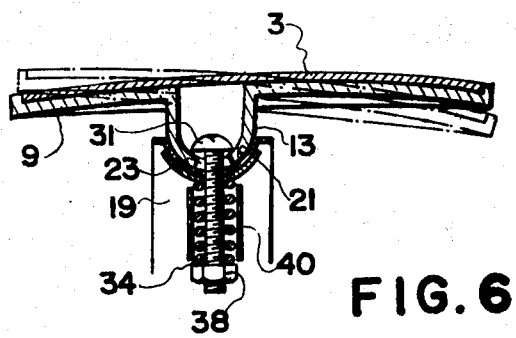
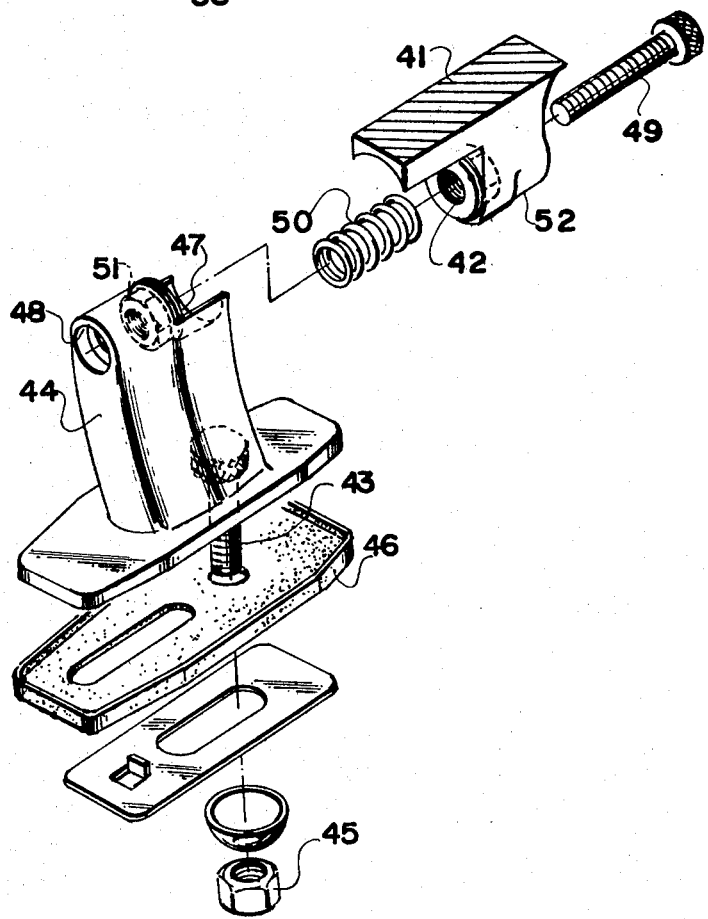

AUTOMOBILE MIRROR DEVICE

This is a continuation application of Ser. No. 911,120, filed May 31, 1978 and now abandoned.

The present invention relates to a device for confirming the safety in the forward dead angle part and the rear of an automobile so that the safety in such dead angle parts as the front wheel part on the other side of the driving seat and the part a little forward of said part and in the rear can be easily confirmed in the driving seat. The forward dead angle parts of the automobile so called in the present invention mean such parts which can not be seen from the driving seat as the front wheel part on the other side of the driving seat and the part a little forward of said part.

Therefore, in the case of an automobile having a handle on the right side, they are the front wheel part on the left side of the car body and the part a little forward of said part. On the contrary, in the case of an automobile having a handle on the left side, they are the front wheel part on the right side of the car body and the part a little forward of said part.

Further, the rear so called in the present invention means the side on the other side of the driving seat and the rear.

In driving an automobile, conventionally the following car is confirmed with both side mirrors and a room mirror.

Further, in starting or parking the car, the safety on both sides of the car is confirmed with both above mentioned side mirrors and the safety in the immediate rear is confirmed with the room mirror. The safety in the front wheel part on the driving seat side and the part a little forward of said part can be confirmed by opening the door or window.

However, the safety in such above mentioned front dead angle parts as the front wheel part on the other side of the driving seat and the part a little forward of said part can not be confirmed in the driving seat. In order to confirm the safety in such parts, the driver must get off.

That is to say, in case a child is in said front dead angle part, the child will will be wounded and it will be dangerous. Further, in case an obstacle is there, the body of the automobile will be damaged.

According to the present invention, the safety in the above mentioned front dead angle parts can be easily confirmed in the driving seat.

A first object of the present invention is to provide a device whereby the safety in such front dead angle parts can be easily confirmed. For that purpose, in the present invention, in addition to the conventional side mirror, there are provided an objective mirror directed to the front wheel part on the other side of the driving seat and the part a little forward of said part and a reflecting mirror to reflect the image on said objective mirror back to the driving seat.

A second object of the present invention is to make a formation whereby the safety in the above mentioned dead angle parts, the side part on the other side of the driving seat and the rear can be confirmed by the driver without using the sighting nerve in excess.

For that purpose, in the present invention, a rear confirming mirror and the above mentioned objective mirror and reflecting mirror are integrally provided so that the safety in the above mentioned dead angle parts, the side part on the other side of the driving seat and the rear can be confirmed by the driver at the same sighting point.

A third object of the present invention is to make it easy to adjust the above mentioned rear confirming mirror, objective mirror and reflecting mirror. Unless the rear confirming mirror, objective mirror and reflecting mirror can be freely adjested depending on the size of the driver, the safety in the required position will not be able to be effectively confirmed. Therefore, in the present invention, the side mirror, objective mirror and reflecting mirror are so formed as to be freely movable in the entire peripheral direction and adjustable in the position.

The above mentioned objects, other objects, features and advantages of the present invention will become clear from the following description of an embodiment shown in the accompanying drawings in which:

FIG. 5 is a magnified view of the objective mirror fitting part;

FIG. 6 is a disassembled view of a part to be fitted to the car body;

Figure 7:
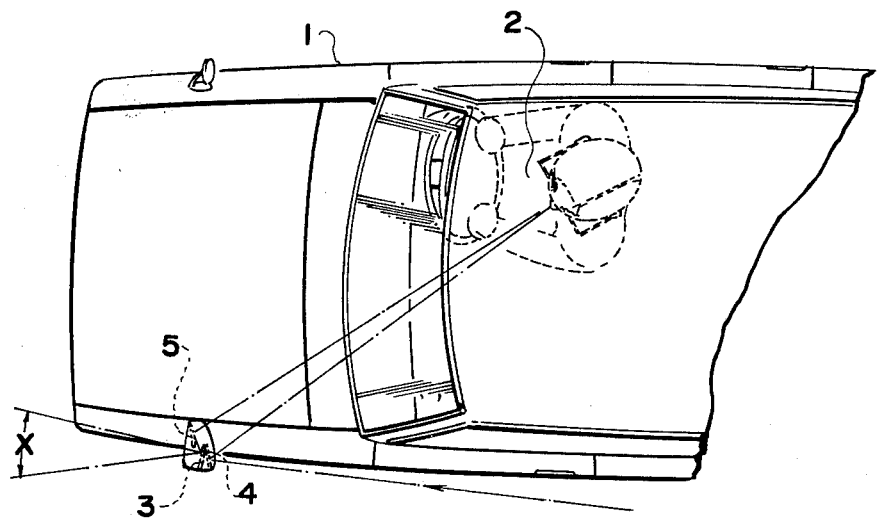
FIG. 7 is a plan view showing the embodiment as fitted to an automobile.

As shown in FIG. 7, the device of the present invention is provided on the hood on the other side of a driving seat 2 of an automobile 1.

That is to say, an objective mirror 3 directed to the front wheel part on the other side of the driving seat 2 and to the part a little forward of said part is provided and a reflecting mirror to reflect the image shown on the objective mirror 3 back to the driving seat is provided in the position diagonally forward of said objective mirror.

A rear confirming mirror 5 is provided in the back position of the objective mirror 3.

Those objective mirror 3, reflecting mirror 4 and rear confirming mirror 5 are integrally provided within a case 6. The details are shown in FIGS. 1 to 6.

That is to say, the interior of the case 6 is so formed as to cover the surfaces above and below the above mentioned respective mirrors 3, 4 and 5 and the parts except the front surface parts of the respective mirrors 3, 4 and 5. Further, a transparent cover 8 is provided in the front surface part of the objective mirror 3.

Figure 1:
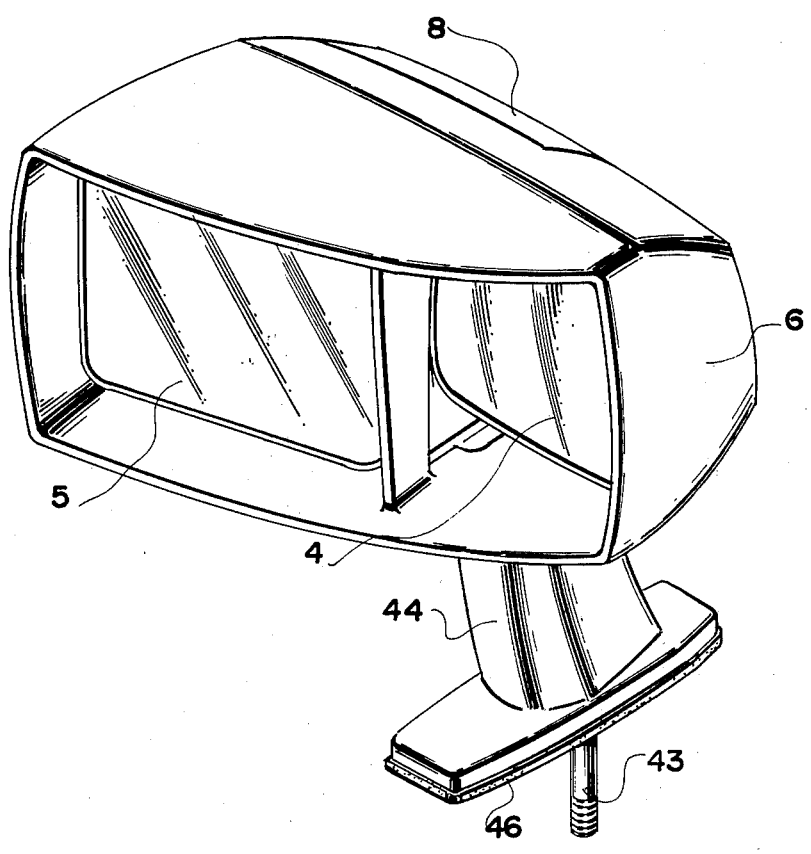
FIG. 1 is a perspective view of an embodiment.
Figure 2:
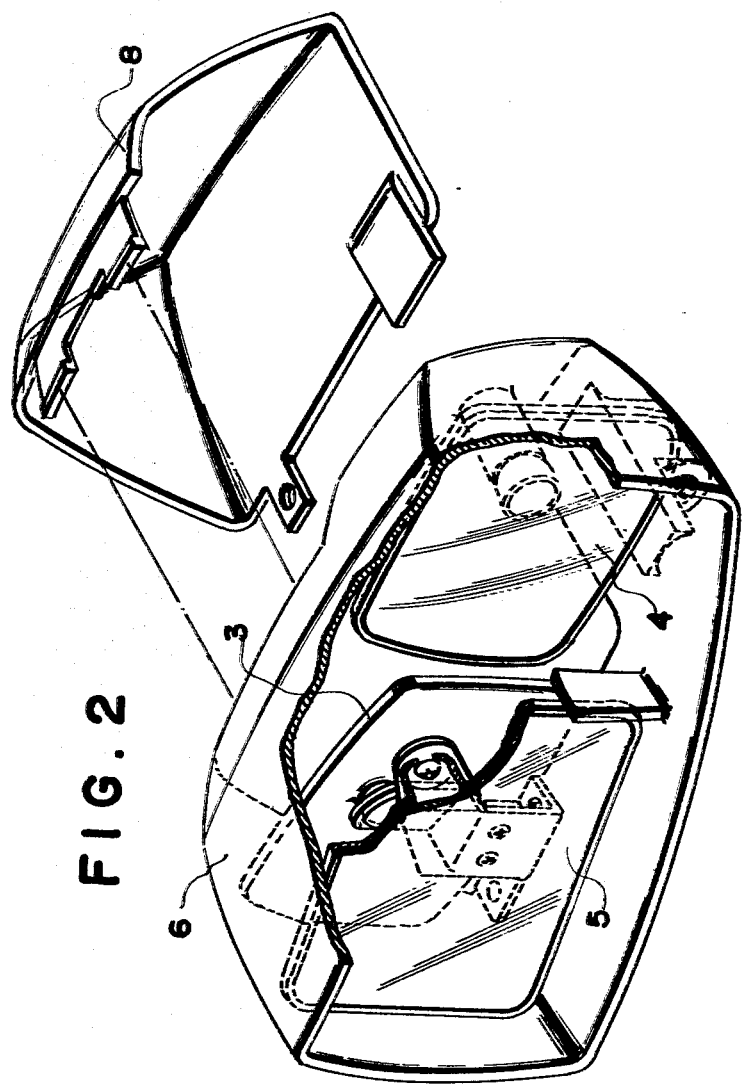
FIG. 2 is a partly sectioned perspective view of an essential part of the same.

Said transparent cover 8 is to act to prevent rain water from being deposited on the objective mirror 3 and entering the case 6, to prevent the objective mirror 3 from being moved by the wind pressure and to prevent the generation of wind sounds during the running of the automobile and is so formed as to be fitted in and fixed to the case 6 as shown in FIG. 2.

The objective mirror 3, reflecting mirror 4 and rear confirming mirror 5 are respectively so formed as to be freely movable in the entire peripheral direction and adjustable in the position. First of all, the objective mirror 3 and rear confirming mirror 5 shall be described. The objective mirror 3 is secured to a back plate 9 through a both-surface adhesive tape 10 and the rear confirming mirror 5 is also secured in the same manner to a back plate 11 through a both-surface adhesive tape 12. Such mirrors may be secured through not only both-surface adhesive tapes but also any other so-called adhesives. Further the peripheral edge of each of the back plates 9 and 11 may be bent to the front surface of the mirror for a proper width so as to hold the mirror. Further, hemispherical hollow projections 13 and 14 are formed respectively on the back plates 9 and 11.

Through holes 15 and 16 are made respectively at the tips of said hemispherical hollow projections 13 and 14.

Figure 4:
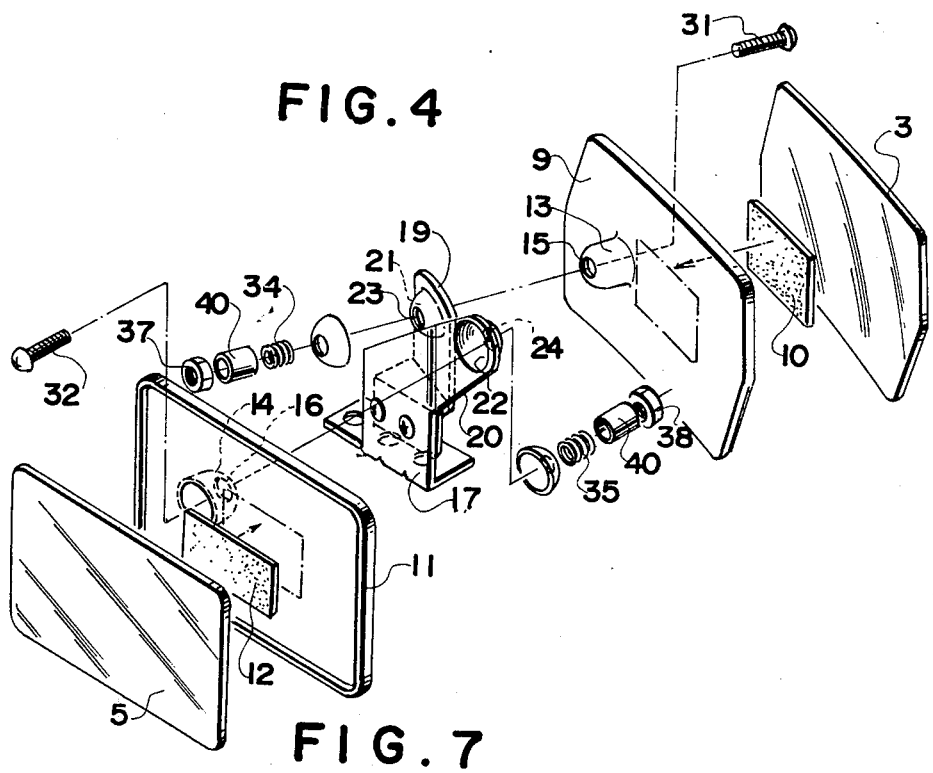
FIG. 4 is a disassembled view of objective mirror and rear confirming mirror fitting parts.

A supporter 17 for fitting the objective mirror 3 and rear confirming mirror 5 is provided as raised on the bottom surface of the case 6. Its details are shown in FIG. 4.

The supporter 17 is formed of two supporting plates 19 and 20 combined as fitted to the positions of fitting the objective mirror 3 and rear confirming mirror 5 in advance. Concavities 21 and 23 fitting respectively the hemispherical hollow projections 13 and 14 formed respectively on said back plates 9 and 11 and provided respectively at the upper ends of the supporting plates 19 and 20. Further, through holes 23 and 24 are made respectively in said concavities 21 and 22.

The above mentioned formation is substantially the same also in the reflecting mirror.

That is to say, the reflecting mirror 4 is also provided with a back plate 25 on which a hemispherical hollow projection 26 is formed and is provided with a through hole 27.

Just the reflecting mirror 4 is directly fitted to the case 6 without using a supporter provided separately within the case 6 as in the above mentioned objective mirror 3 and rear confirming mirror 5.

Figure 3:
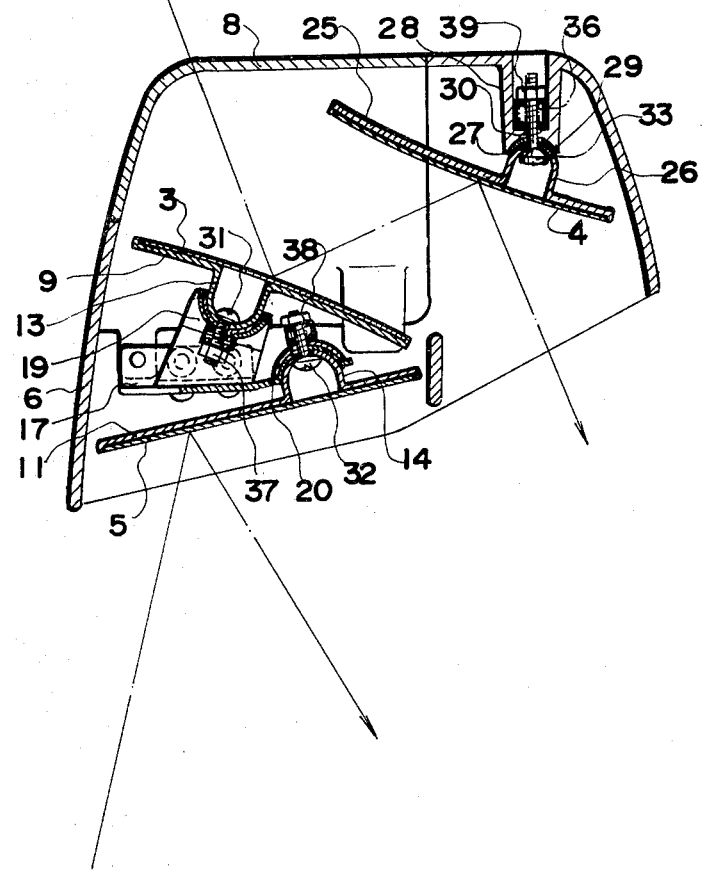
FIG. 3 is a sectioned view on line A—A in FIG. 1.

To explain more particularly, as shown in FIG. 3, in molding the case 6, a hollow projection 28 is formed within the case 6, a concavity 29 fitting the hemispherical hollow projection 26 formed on the above mentioned back plate 25 is made at the inner end of said projection 28 and a through hole 30 is made in said concavity 29. The objective mirror 3, rear confirming mirror 5 and reflecting mirror 4 are fitted within the case 6 respectively through bolts 31, 32 and 33, springs 34, 35 and 36 and nuts 37, 38 and 39. The embodiment is shown in FIGS. 3 to 5.

In the present invention, the screw parts of the bolts 31, 32 and 33 are formed to be respectively of diameters smaller than of the through holes 15, 16 and 27 made respectively in the hemispherical hollow projections 13, 14 and 16 formed respectively on the back plates 9, 11 and 25. Reversely speaking, the through holes 15, 16 and 27 are formed to be respectively a little larger than the acrew parts of the bolts 31, 32 and 33. By the way, the fitting part of the objective mirror 3 is shown as an example in FIG. 5. However, the reflecting mirror 4 and rear confirming mirror 5 are also in the same manner. The bolts 31, 32 and 33 are inserted respectively through the through holes 15, 16 and 27 of the hollow projections 13, 14 and 26 respectively on the back plates 9, 11 and 25 and respectively into the through holes 23, 24 and 27 made respectively in the above mentioned concavities 21, 22 and 29 fitted respectively to said hollow projections 13, 14 and 26.

As a result, the head parts of the respective bolts 31, 32 and 33 are locked respectively with the hollow projections 13, 14 and 26 respectively on the back plates 9, 11 and 25 and the screw parts project respectively on the back surface parts of the concavities 21, 23 and 29.

Then, springs 34, 35 and 36 and nuts 37, 38 and 39 are fitted respectively to the screw parts of the bolts 31, 32 and 33. By the way, in the drawings, 40 is a guide ring for the spring.

FIG. 6 shows the case 6 having the objective mirror 3, reflecting mirror 4 and rear confirming mirror 5 build in it as fitted to the hood of an automobile. A base part 41 is secured to the bottom surface part of the case 6, is arcuated 52 below and is provided with a hole 42. A supporting stand 44 having a male screw rod 43 provided at the lower end is fitted to the hood side of the car through a nut 45.

In the drawing, 46 is a base seat of rubber or the like provided as inserted between the hood of the car and the above mentioned supporting stand 44 to act to prevent the hood of the car from being damaged.

Further, a semicircular concavity 47 fitting the arcuated part 52 formed below the above mentioned base part 41 is provided on one side of the upper end of the supporting stand 44. The base part 41 and supporting stand 44 are fitted to each other, a separately prepared fitting bolt 49 is inserted through the holes 42 and 48 and a spring 50 is interposed between them and the case 6 is fitted to the hood part of the car through a nut 51. According to this fitting structure, the case 6 can be rocked though in a fixed range on the supporting stand 44.

According to the present invention of the above mentioned formation, with the objective mirror 3 and reflecting mirror 4, the safety in the forward dead angle parts on the other side of the driving seat, that is, in the range X in FIG. 7 can be confirmed from the driving seat and, with the rear confirming mirror 5, the safety in the part on the other side of the driving seat and in the rear can be recognized.

Further, according to the present invention, as the above mentioned three mirrors are formed to be integral, with them, the safety can be confirmed at the same sighting point. Further, the objective mirror 3, reflecting mirror 4 and rear confirming mirror 5 can be freely moved in the entire peripheral direction and can be adjusted to conform to the sighting point of the driver.

That is to say, it is because a clearance is formed between each of the through holes 15, 16 and 27 made in the hemispherical projections of the respective mirrors and each of the bolts 31, 33 and 33.

It is also as described above that the entire case can be rocked.

Further, when the transparent cover 8 is secured, it will be difficult to adjust the objective mirror 3 from the outside. However, even if the objective mirror is not adjusted each time, it will be able to be conformed to the sighting point of the driver by adjusting the reflecting mirror.

A preferred embodiment of the present invention has been explained in detail in the above. However, this explanation is only of an example.

What is claimed is:

1. A multi-mirror device to be mounted on a vehicle for front and rear viewing on the side of a vehicle opposite to that of the driver's seat, said device comprising a casing having side walls, top and bottom walls, and a front wall, at least a portion of which is formed of a transparent material; a support bracket carried within said casing having a pair of support plates offset angularly relative to each other; a first rear view mirror and a front view mirror in alignment with the transparent portion of the front wall; a backing plate secured to the rear face of each of said rear view and front view mirrors, a hollow hemispheric projection on each of said backing plates in a direction away from the mirror surface, complementary hollow projections formed on each of said support plates, and means for resiliently and pivotably mounting said rear view and front view mirrors on respectives of said support plates, a third reflecting mirror mounted within said casing facing in a generally rearwardly direction and adapted to reflect the image of said front view mirror rearwardly, at least the transparent portion of said front wall of said casing being removably for manual manipulation of support plates and each of said mirrors and the rear edges of said side top and bottom walls extending rearwardly of said rear view mirror to shelter the same and permit access to said front and rear view mirrors for adjustment while being protected from the elements.

* * * * *